(12) United States Patent
Paya et al.

(10) Patent No.: US 8,706,081 B1
(45) Date of Patent: Apr. 22, 2014

(54) PACKET INSPECTION IN NEAR FIELD COMMUNICATION CONTROLLER FOR SECURE ELEMENT PROTECTION

(71) Applicant: Google Inc., Mountain View, CA (US)

(72) Inventors: Ismail Cem Paya, San Francisco, CA (US); Shane Alexander Farmer, San Francisco, CA (US); Robert Tsai, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/717,904

(22) Filed: Dec. 18, 2012

(51) Int. Cl.
*H04M 1/66* (2006.01)
(52) U.S. Cl.
USPC ............................ 455/410; 455/411; 455/41.1
(58) Field of Classification Search
USPC ............... 455/411; 705/65, 71, 20; 726/5, 20; 235/375, 380
See application file for complete search history.

(56) References Cited

U.S. PATENT DOCUMENTS

| | | | |
|---|---|---|---|
| 8,060,012 B2 | 11/2011 | Sklovsky et al. | |
| 8,151,345 B1 * | 4/2012 | Yeager | 726/20 |
| 2008/0167017 A1 | 7/2008 | Wentker et al. | |
| 2008/0167961 A1 | 7/2008 | Wentker et al. | |
| 2009/0247078 A1 | 10/2009 | Sklovsky et al. | |
| 2010/0190437 A1 | 7/2010 | Buhot | |
| 2010/0207742 A1 | 8/2010 | Buhot et al. | |
| 2012/0047237 A1 | 2/2012 | Arvidsson et al. | |
| 2012/0095852 A1 | 4/2012 | Bauer et al. | |
| 2012/0129452 A1 | 5/2012 | Koh et al. | |
| 2012/0130838 A1 | 5/2012 | Koh et al. | |
| 2012/0130839 A1 | 5/2012 | Koh et al. | |
| 2012/0173432 A1 * | 7/2012 | Yeager | 705/65 |
| 2012/0317628 A1 * | 12/2012 | Yeager | 726/5 |
| 2013/0054474 A1 * | 2/2013 | Yeager | 705/71 |

* cited by examiner

*Primary Examiner* — April G Gonzales
(74) *Attorney, Agent, or Firm* — Leydig, Voit & Mayer, Ltd.

(57) ABSTRACT

A method and system for packet inspection in a near field communication (NFC) controller for secure element (SE) protection are described. In a communication device, the NFC controller can receive filtering rules that correspond to security for an applet in the SE. The NFC controller can also receive a packet with commands or instructions for the SE. The NFC controller can inspect the contents of the packet based on the filtering rules and determine whether to communicate the packet to the SE. The packet filtering performed by the NFC controller can also be based on whether the packet was received through an interface with an operating system in the communication device or through an interface with an NFC antenna. The filtering rules can be removed or disabled when an update for the applet is received and installed in the SE.

20 Claims, 9 Drawing Sheets

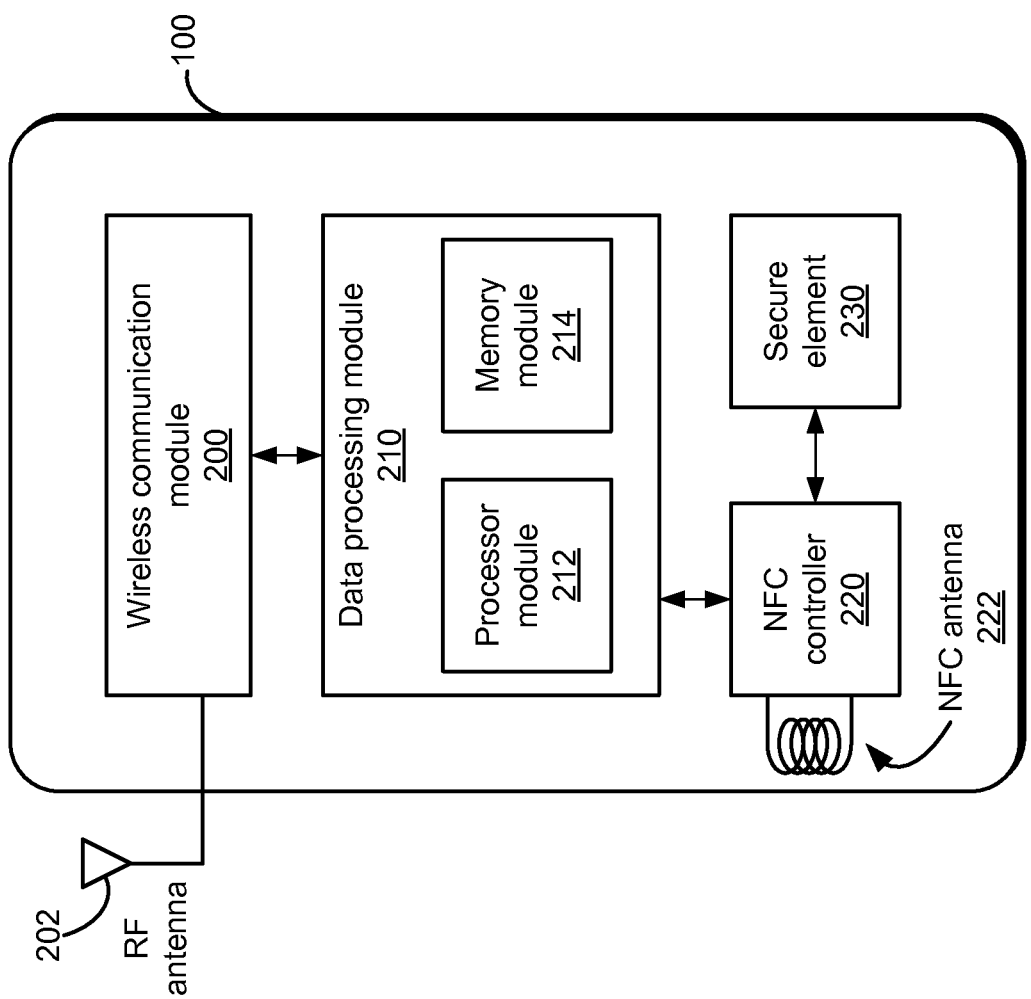

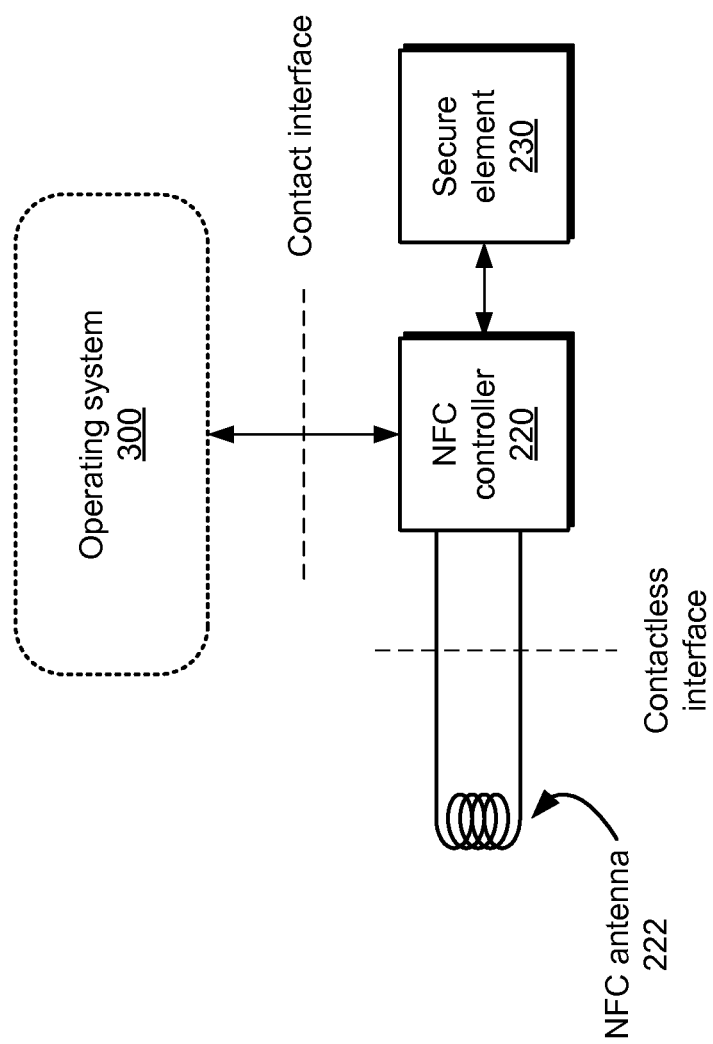

PACKET INSPECTION IN NEAR FIELD COMMUNICATION CONTROLLER FOR SECURE ELEMENT PROTECTION

BACKGROUND

Tamper-resistant hardware known as secure elements can be used with short-range wireless technologies in communication devices to enable contactless applications such as electronic commerce transactions.

Further limitations and disadvantages of conventional and traditional approaches will become apparent to one of skill in the art, through comparison of such systems with some aspects of the present disclosure as set forth in the remainder of the present application with reference to the drawings.

SUMMARY OF THE DISCLOSURE

A method is provided in which, in a communication device including a near field communication (NFC) controller and a secure element (SE) communicatively coupled to the NFC controller, the NFC controller can receive one or more filtering rules corresponding to security (e.g., a security fix) for an applet in the SE. The NFC controller can receive a data packet for the SE and can determine whether to communicate the data packet to the SE based on the one or more filtering rules.

A communication device is provided that includes an SE and an NFC controller communicatively coupled to the SE. The NFC controller can have a memory containing executable instructions that cause the NFC controller to perform a method for handling data. The method performed by the NFC controller includes receiving one or more filtering rules corresponding to security (e.g., a security fix) for an applet in the SE, receiving a data packet for the SE, and determining whether to communicate the data packet to the SE based on the one or more filtering rules.

Another method is provided in which, in a communication device including an NFC controller and an SE communicatively coupled to the NFC controller, the NFC controller can receive one or more rules corresponding to security (e.g., a security fix) for an applet in the SE. The NFC controller can receive a data unit for the SE and can compare at least a portion of the information in the data unit with information in the one or more rules. The NFC controller can then determine whether to communicate the data unit to the SE based on the comparison.

These and other advantages, aspects and novel features of the present disclosure, as well as details of illustrated implementations thereof, will be more fully understood from the following description and drawings.

BRIEF DESCRIPTION OF SEVERAL VIEWS OF THE DRAWINGS

FIGS. 2A and 2B are each a block diagram that illustrates an example of an architecture of the communication device in FIG. 1.

FIG. 3 is a block diagram that illustrates an example of different data interfaces of a near field communication (NFC) controller.

DETAILED DESCRIPTION

Figure 1:
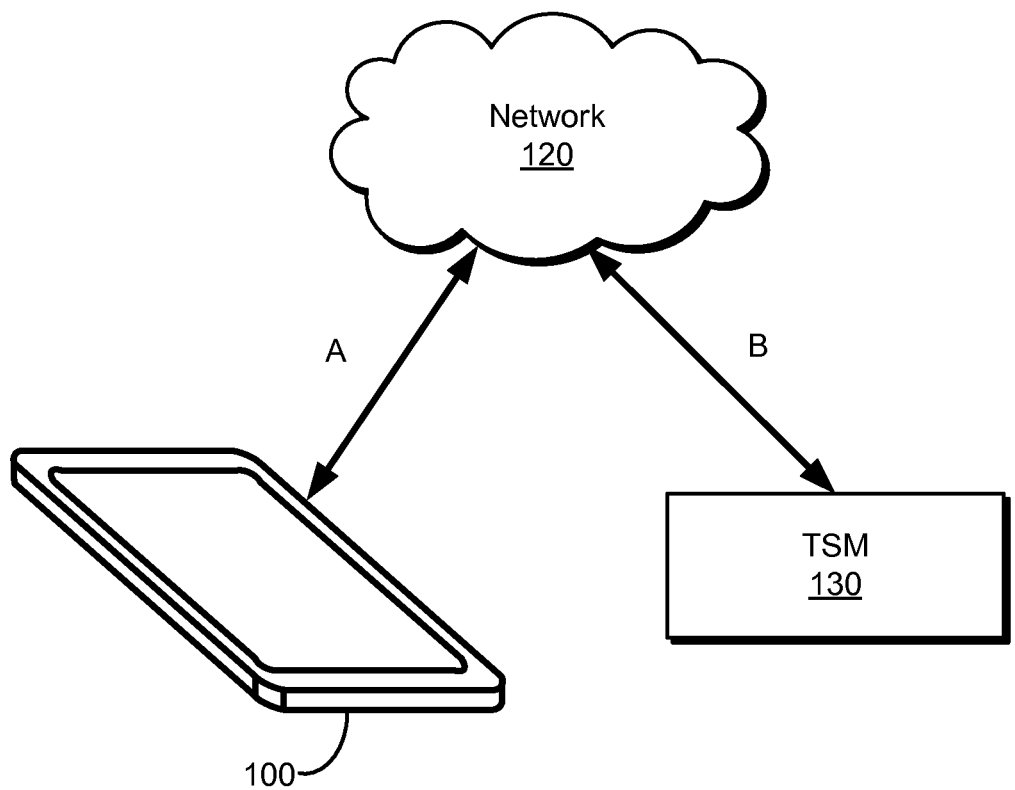
FIG. 1 is a diagram that illustrates an example of a communication device.

Certain implementations described in the disclosure relate to a method and system for packet inspection in a near field communication (NFC) controller for secure element (SE) protection. The secure element is typically a tamper-resistant piece of hardware (e.g., an integrated circuit) that enables the implementation of security-sensitive applications. Communication devices, such as handsets, smartphones, tablets, laptops, and other handheld or portable devices, can include a secure element that is coupled to an NFC controller, which in turn handles communications to and from the secure element. The combined operation of the NFC controller and the secure element can enable the communication device to perform contactless commercial transactions such as electronic payments.

The functionality of the secure element can be implemented by one or more applets. An applet can refer to an application, program, or other type of software that is used to perform a particular task. Because the platform of a secure element is typically closed, users do not generally have privileges to install and/or update applets on their own. Instead, such tasks are handled by third-party service providers known as Trusted Service Managers (TSMs). Moreover, the applets provided to a secure element are often subject to a certification requirement. For example, when a communication device is being used as an electronic wallet, a financial services or payment processing entity may need to approve any applet installation and/or update. As a result, when a security vulnerability is discovered in connection with an applet, the delivery of an approved applet update through the proper third-party service provider can take a significant amount of time. Until the code update is received and installed, the secure element remains exposed to the security flaw.

Other situations in which an applet update may occur include, but need not be limited to, providing a work around for any type of applet bug, enhancing the functionality of an applet even in the absence of any bugs, and/or improving applet compatibility. For example, an applet may have to communicate with some external device such as a point-of-sale terminal that is sending incorrectly formatted packets. Because modifying the installed base of point-of-sale terminals could be difficult and/or costly, modifying the functionality of the applet to allow the applet to handle the packets and operate successfully with the faulty equipment may be preferable.

Various implementations provide for using the NFC controller to implement protections to the secure element until the applet code can be updated or revised. For example, the NFC controller can operate as a firewall that inspects data packets sent to and/or from the secure element to determine which ones to forward to the secure element and which ones to discard. When used in a manner similar to that of a stateful firewall, the NFC controller can allow data packets that match a parameter or pattern through to the secure element and reject those data packets that fail to match.

FIG. 1 is a diagram that illustrates an example of a communication device. Referring to FIG. 1, there is shown a communication device 100 that can connect to a Trusted Service Manager (TSM) 130 through a network 120.

The communication device 100 can be a handset, a smartphone, a tablet, a laptop, or other handheld or portable device, for example. The communication device 100 can support short-range wireless communication technologies (e.g., NFC) and can include a secure element. The communication device 100 can be used to perform different types of contactless commercial transactions including but not limited to electronic payments.

The network 120 can support communication between the communication device 100 and the TSM 130. For example, communication between the communication device 100 and the network 120 can occur through a link A, while communication between the network 120 and the TSM 130 can occur through a link B. The network 120 can support also support communication between the communication device 100 and a network operator (not shown), a device manufacturer (not shown), and/or another entity (not shown), each of which capable of having access to and/or control of the secure element in the communication device 100. The various communications described above can take place through a wireless connection and/or a wireline connection.

The TSM 130 can be a neutral third-party service provider that handles business and technical agreements with network operators, device manufacturers, and/or other entities that have access to and/or control of the secure element in the communication device 100. The TSM 130 can perform applet code updates by sending approved updates to the communication device 100 through the network 120. While the TSM 130 typically has the appropriate credentials to manage secure element content, it may not have the privileges needed to interact with the operating system and/or an NFC controller in the communication device 100. Devices and/or entities other than the TSM 130 can be typically used to send temporary fixes to the NFC controller in the communication device 100 to protect the secure element from security vulnerabilities until an applet code update is ready and approved for sending. Because the host device (e.g., the communication device 100) does not typically have the authority to add/remove such fixes, the operating system in the host device may not be capable of defining the fixes in order to protect a secure element applet from a malicious application that may reside on the host device. Accordingly, an external authority or entity that is capable of updating the NFC controller may be needed to communicate with the communication device 100 to provide temporary fixes to address some aspects of the functionality of an applet in a secure element.

FIG. 2A is a block diagram that illustrates an example of an architecture of the communication device in FIG. 1. Referring to FIG. 2A, there is shown the communication device 100 having a wireless communication module 200, a data processing module 210, an NFC controller 220, and a secure element 230.

The wireless communication module 200 can process signals received and/or transmitted through the radio frequency (RF) antenna 202. The signal processing can include various RF and/or baseband operations such as amplification, filtering, mixing, modulating, demodulating, encoding, and decoding, for example.

The data processing module 210 can be operable to perform data handling operations, including those operations related to communication, user interaction, video/audio capture and/or reproduction, and/or other operations typically performed by a communication device. The data processing module 210 can also provide system management functionality for the communication device 100.

The data processing module 210 can include a processor module 212 and a memory module 214. The processor module 212 can have one or more integrated circuits that are operable to carry out the instructions of a program or application by performing arithmetical, logical, and input/output operations. The processor module 212 can have a central processing unit (CPU) and/or other type of microprocessor or microcontroller to perform the various operations. The processor module 212 can support the execution of an operating system (OS) that serves as a software platform on top of which application programs can run.

The memory 214 can have one or more integrated circuits that are operable to store and/or retrieve data that can be utilized in the operations performed by the processor module 212. The processor module 212 and the memory module 214 can be used to enable the NFC controller 220 to receive information (e.g., rules, data packets) from the wireless communication module 200. The information can be communicated to the NFC controller 220 through the operating system and/or through one or more application programs running on the operating system.

The NFC controller 220 can be operable to support NFC operations, including transmission and/or reception of signals through the NFC antenna 222. Some of the signal processing operations supported by the NFC controller 220 can include, but need not be limited to, amplification, filtering, mixing, modulating, demodulating, encoding, and decoding, for example. In some instances, the NFC controller 220 can also support other types of wireless communication technologies such as Bluetooth, IEEE 802.11, Global Positioning System (GPS), and/or frequency modulation (FM), for example. In these instances, the NFC antenna 222, or some other antenna connected to the NFC controller 220, can be used to enable communication through the various wireless communication technologies supported by the NFC controller 220.

The NFC controller 220 can be directly coupled to the secure element 230. That is, most or all communication that originates in the secure element 230 or that is destined for the secure element 230 may need to pass through the NFC controller 220. Communications with the secure element 230 that occur through the NFC controller 220 can include communications with the operating system, or with application programs running on the operating system, as well as communications with external sources that take place through the NFC antenna 222.

The secure element 230 can be operable to store information such as credentials that are used for conducting sensitive transactions. Sensitive transactions can include, but need not be limited to, making a payment or authenticating the device owner to another party. The secure element 230 can operate as an agent and can use the credentials on behalf of an application that is resident on the communication device 100 or that is external to the communication device 100, such as a point-of-sale terminal brought into proximity or contact with the communication device 100, for example. The applets in the secure element 230 do not typically reveal or surrender the credentials to an application. Instead, the credential can be used in a cryptographic protocol to prove possession without revealing the information.

As described above, the functionality of the secure element 230 can be implemented by one or more applets. The code corresponding to these applets can be stored in the secure element 230 and can be updated by the proper entity when the code update has been approved.

The NFC controller 220 can be operable to inspect or examine some or all of the traffic that is destined for the secure element 230. The traffic typically includes data packets, an example of which is an Application Protocol Data Unit (APDU). In some instances, the NFC controller 220 can look at incoming APDUs arriving through signals received by the NFC antenna 222 and determine if one or more of the APDUs represent an attempt to invoke a certain function of the secure element 230. When the NFC controller 230 determines that a function of the secure element 230 is being invoked, the NFC controller 220 can notify the operating system. The notifications made by the NFC controller 220 are typically informational in nature, that is, they do not reveal the actual data that is being delivered to the secure element 230. Moreover, the notifications are typically generated after the fact, that is, once the data has already been received by the secure element 230. The NFC controller 220 can be used to provide this functionality because the operating system would not typically have visibility into the data arriving through the NFC antenna 222 as the data is passed straight from the NFC antenna 222 to the secure element 230 via the NFC controller 220. Even when informed, the operating system may not have fine-grained options available to modify traffic selectively. Instead, the operating system may be limited to more global options such as shutting off the NFC radio capabilities or resetting the secure element 230.

The ability of the NFC controller 220 to inspect or examine data traffic destined for the secure element 230 can be used as a security feature to protect applets in the secure element 230 against bugs or flaws that result in a security vulnerability. The NFC controller 220 has firmware that can be updated in the field and that is not subject to the stringent requirements that cover updates to code in the secure element 230. Thus, it can be easier and more efficient to implement and deploy security fixes as an update to the NFC controller 220 compared to updates to an applet in the secure element 230. These security fixes can be made temporary and can be disabled or removed when an approved applet code update is deployed and installed in the secure element 230 by the proper entity.

Figure 2B:
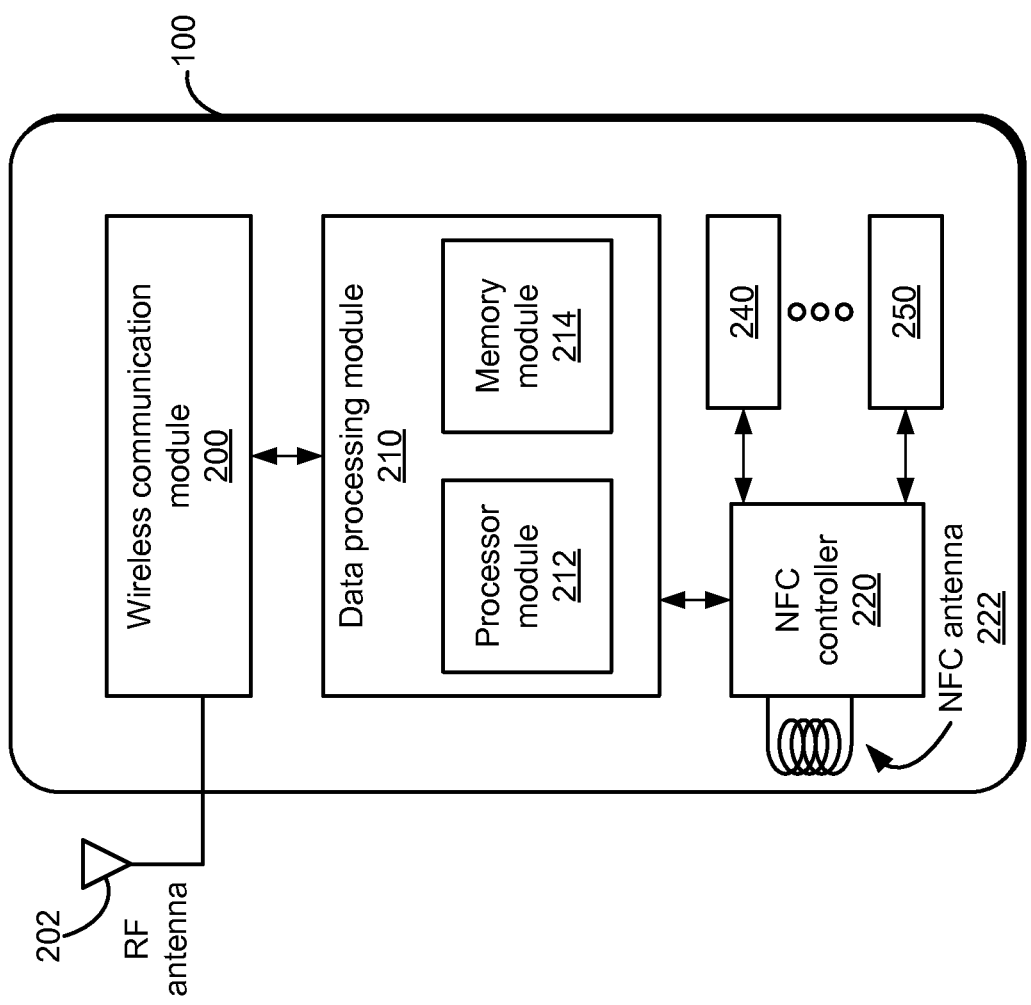

Referring to FIG. 2B, there is shown another implementation of the communication device 100 in which the NFC controller 220 can be directly coupled to multiple secure elements 240, . . . , 250. The functions, operations, rules, and/or the like described throughout the disclosure in reference to the secure element 230 shown in FIG. 2A can be applicable to any one of the multiple secure elements 240, . . . , 250 shown in FIG. 2B.

In one example, the secure element 240 can be a subscriber identity module (SIM) card. In this example, the single-wire protocol (SWP) standard can be used to connect the NFC antenna 222 to the secure element 240 through the NFC controller 220. The NFC controller 220 can therefore be connected to both the secure element 240 (e.g., SIM card) and the secure element 250, which can be an embedded secure element such as the secure element 230 described above. Traffic to and from the secure elements 240 and 250 can go through the NFC controller 220, which can provide different types of interception and/or modification capabilities based on the secure element corresponding to the traffic.

In some implementations, the secure element 230, 240, and/or 250 in the communication device 100 can be part of a microSD card or other flash memory card used for storage. In this example, the SWP standard described above can be used to relay NFC communications from the NFC antenna 222 to the microSD card.

FIG. 3 is a block diagram that illustrates an example of different data interfaces of a near field communication (NFC) controller. Referring to FIG. 3, there is shown an operating system 300 as well as the NFC controller 220, the NFC antenna 222, and the secure element 230. The operating system 300 can correspond to the operating system that runs or executes on the communication device 100 as described above with respect to FIGS. 2A and 2B.

Also shown in FIG. 3 are two interfaces. A first interface typically referred to as a contact interface can occur between the operating system 300, or an application program running on the operating system 300, and the NFC controller 220. A second interface typically referred to as a contactless interface can occur between an external wireless source (e.g., at the NFC antenna 222) and the NFC controller 220.

The NFC controller 220 can implement security fixes that can be based on the interface through which the data packet is received by the NFC controller 220. That is, the NFC controller 220 can be used to prevent an applet in the secure element 230 to be accessed over the wrong interface. For example, there may be security requirements that an applet can be used over only a particular interface, whether it is the contact interface or the contactless interface. If a flaw or bug in the applet code allows for circumventing the security requirements, the NFC controller 220 can compensate for the flaw because it knows which interface is being used when delivering the data packets (e.g., APDUs) to the secure element 230. Thus, after inspection, the NFC controller 220 can determine that a data packet has been received through the wrong interface and can discard the data packet so that it is never received by the secure element 230.

Figure 4:
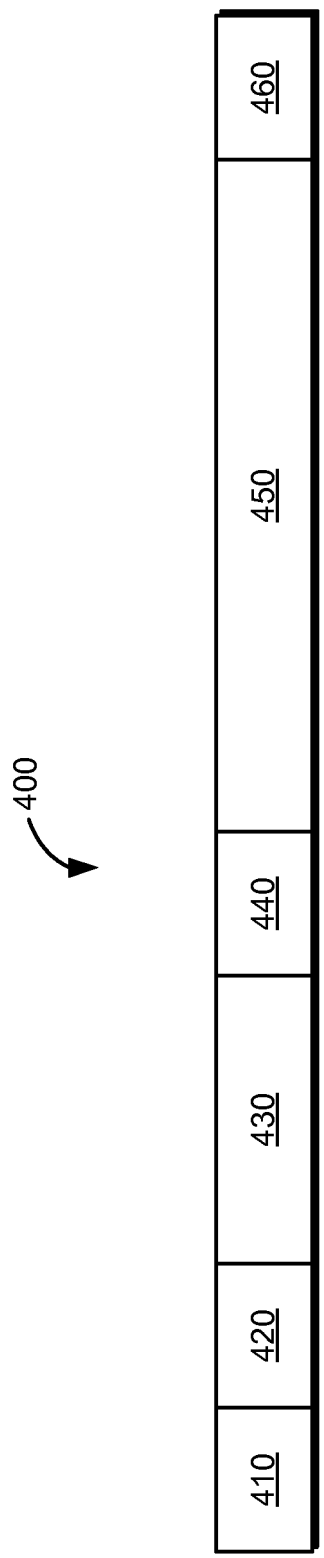
FIG. 4 is a diagram that illustrates an example of a data packet for a secure element.

The NFC controller 220 can also implement other types of security fixes. In another example of a security fix, the NFC controller 220 can prevent specific commands from being delivered to an applet in the secure element 230 when a portion of the command matches a pattern corresponding to an attempt to exploit a known security vulnerability. To determine a match, the NFC controller 220 can filter one or more portions of a data packet corresponding to the command. For example, FIG. 4 illustrates an example of an APDU that can be used for sending commands to the secure element 230. The command APDU 400 in FIG. 4 can include fields 410, . . . , 460. The field 410 can have an instruction class (CLA) that indicates the type of command and can be one byte in length. The field 420 can have an instruction code (INS) that indicates a specific command and can be one byte in length. The field 430 can have instructions parameters for the command (P1/P2) and can be two bytes in length. The field 440 can be used to encode command data and can be zero, one, or three bytes in length. The field 450 can have a number (Nc) of command data bytes. Moreover, the field 460 can be used to encode the maximum number of response bytes expected. Based on the structure shown in FIG. 4, the NFC controller 220 can filter the command APDU 400 based on instruction class, instruction code, instruction parameters, length of payload or command data, and/or having a portion of the payload match a regular expression or pattern. The length of the payload can be used as a filtering criterion when the size of the payload can cause a buffer overflow, for example.

In another example of a security fix, the NFC controller 220 can be used to ensure that access to an applet over a particular interface uses secure messaging. Secure messaging APDUs can be identified by their instruction class (e.g., the field 410). In this example, the NFC controller 220 can filter the APDU based on secure messaging information and on the interface through which the APDU is received by the NFC controller 220. When secure messaging is not used or it is used through the wrong interface, the NFC controller 220 can discard the APDU or data packet.

In the presence of secure messaging, the APDU header is still visible to the NFC controller 220, including class, instruction, P1/P2, and length information. The payload that follows is typically encrypted using cryptographic keys and accessible by the secure element 230. While the NFC controller 220 may not be able to look into the payload, it can make filtering decisions based on the information in the header that is visible, including that a particular APDU is a secure messaging APDU as indicated by the class byte.

There may be instances when a security fix allows the NFC controller 220 to modify or replace a portion of a data packet to allow the data packet to be sent to the secure element 230. In those instances, the NFC controller 220 can make the modification or replacement in accordance with specific rules or guidelines stored in the NFC controller 220 that ensure that the changes made do not result in a security vulnerability of the secure element 230.

Figure 5B:
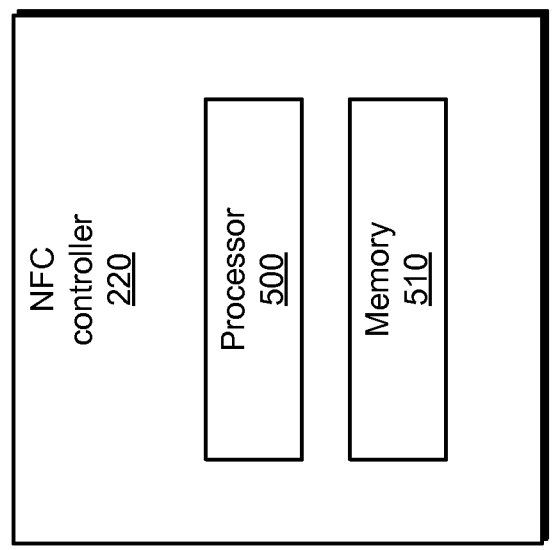
FIG. 5B is a block diagram that illustrates an example of a secure element.
Figure 5A:
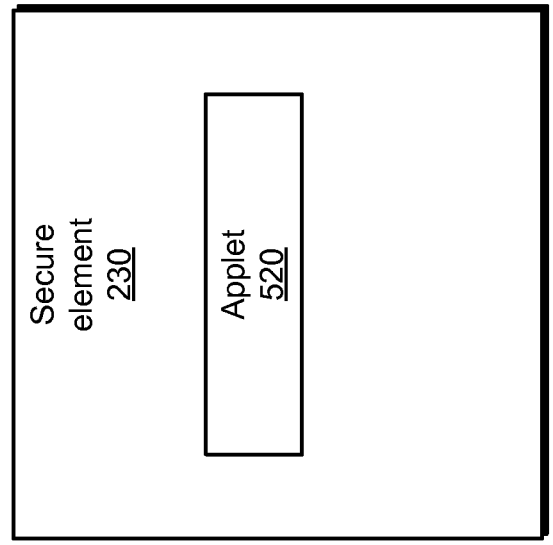
FIG. 5A is a block diagram that illustrates an example of a NFC controller.

FIG. 5A is a block diagram that illustrates an example of a NFC controller. Referring to FIG. 5A, there is shown the NFC controller 220 having a processor 500 and a memory 510. The processor 500 can include a CPU or a microcontroller that enables the NFC controller 220 to perform NFC communication functions. The processor 500 can be operable to enable the NFC controller 220 to define and implement rules (e.g., filtering rules) that can be used as security fixes for protection of a secure element. The processor 500 can also be used handle those portions of a data packet that may be signed or cryptographically authenticated.

The memory 510 can be used to store data used for NFC communications, for defining and implementing rules that can be used as security fixes for protection of a secure element, and/or keys or other similar information that can be used to handle those portions of a data packet that may be signed or cryptographically authenticated.

There may be different ways in which the rules (e.g., filtering rules) corresponding to a security fix can be implemented. For example, the rules can be hard-coded into the firmware image used in the NFC controller 220. Deploying the rules, and the security fix, may involve flashing a new firmware image. In another example, a mechanism can exist that is used for specifying or defining the rules. Such mechanism can include using a language that describes a set of conditions (e.g., interface, current applet, pattern in a particular APDU field) and the actions to be taken when those conditions are met (e.g., drop the APDU, reset the secure element). In this example, the NFC controller 220 can use a set of commands that enables it to add and/or remove rules having particular conditions and actions. The information from which the rules are defined can be signed or cryptographically authenticated to prevent an attacker that has compromised the operating system from removing or altering an existing rule. The NFC controller 220 can be operable to handle (e.g., verify) the signed or cryptographically authenticated information using a key stored in the memory 510, for example.

The rules handled by the NFC controller 220 may be signed or cryptographically authenticated because of data integrity requirements. For example, the NFC controller 220 may want to ensure that the new content inspections rules that are added and/or removed were created by an appropriate entity. One such entity can be the manufacturer of the NFC controller 220 or the vendor of the operating system, for example. Moreover, the NFC controller 220 may want to verify that the rules have not been tampered with since they were originally created by the appropriate authority. Typically, the use of encryption may not be necessary and/or may not prove to be sufficient to ensure data integrity. Instead, other cryptographic techniques such as, but not limited to, digital signatures and/or message-authentication codes (MACs) can be used to ensure data integrity. In these instances, the NFC controller 220 can be operable to verify the signature or MAC.

In some implementations, however, to prevent reverse engineering of an update that could reveal the existence of a vulnerability in some secure element applet that has not been made public, the content of the rules can be kept hidden by using encryption in addition to other cryptographic techniques.

FIG. 5B is a block diagram that illustrates an example of a secure element. Referring to FIG. 5B, there is shown the secure element 230 having an applet 520. The applet 520 can be an application, program, or other type of software that is used to perform a particular task in the secure element 230. The functionality of the applet 520 can enable the communication device 100 to perform contactless commercial transactions such as electronic payments. While a single applet is shown in FIG. 5B, the secure element 230 can include multiple applets where two or more of those applets provide the functionality needed to perform contactless commercial transactions. Moreover, the secure element 230 can include logic, circuitry, and/or code that can enable the operation of the applet 520 and/or of any other applets.

The NFC controller 220 and the secure element 230 shown in FIGS. 5A and 5B, respectively, can communicate directly (e.g., through a single wire) and can each include an appropriate input/output interface to enable such communication. In some implementation, the NFC controller 220 and the secure element 230 can be combined into a single integrated circuit or chip. In such instances, the direct communication between the two components can occur internal to the integrated circuit.

Figure 6:
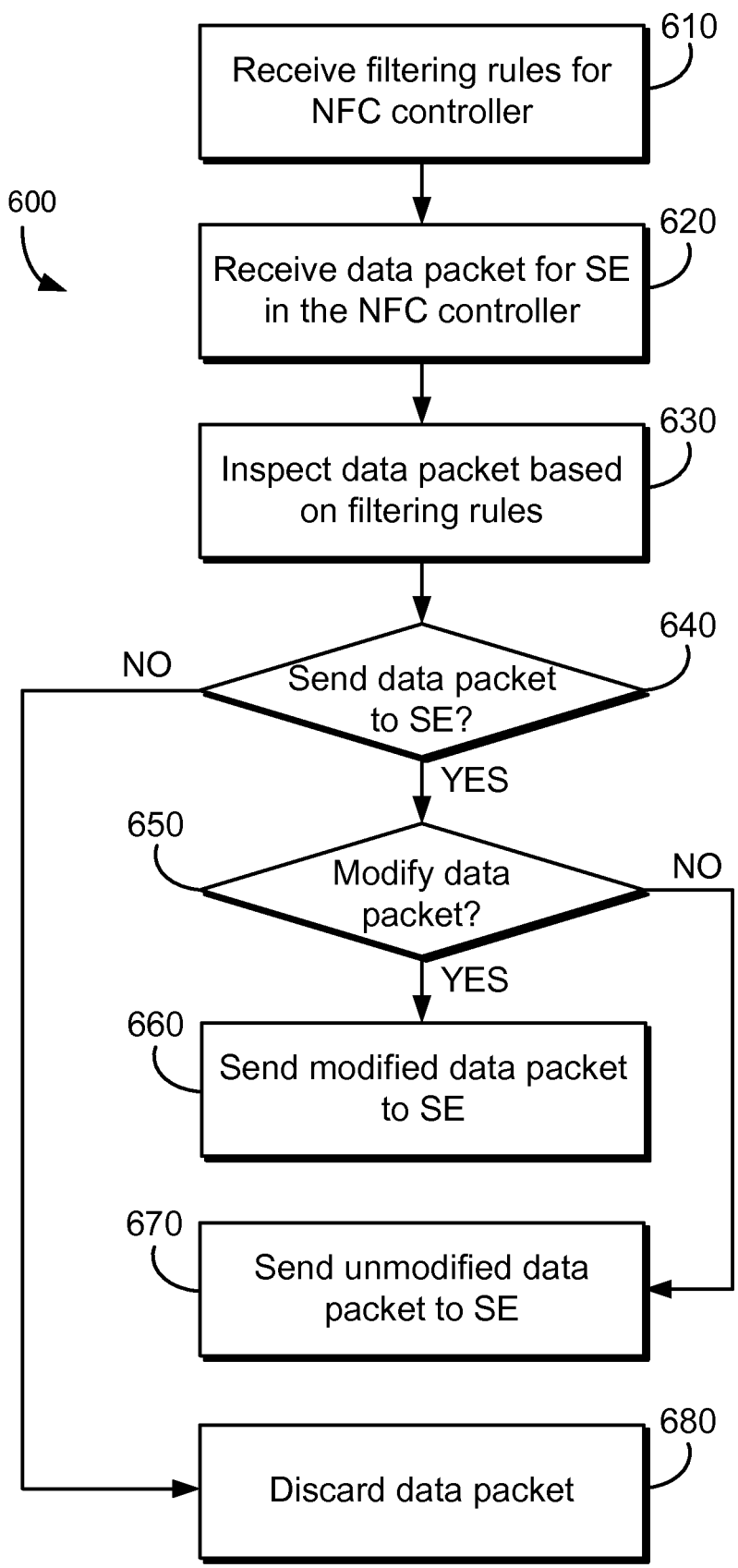
FIGS. 6-8 are each a flow chart that illustrates examples of steps for packet inspection for secure element protection.
Figure 7:
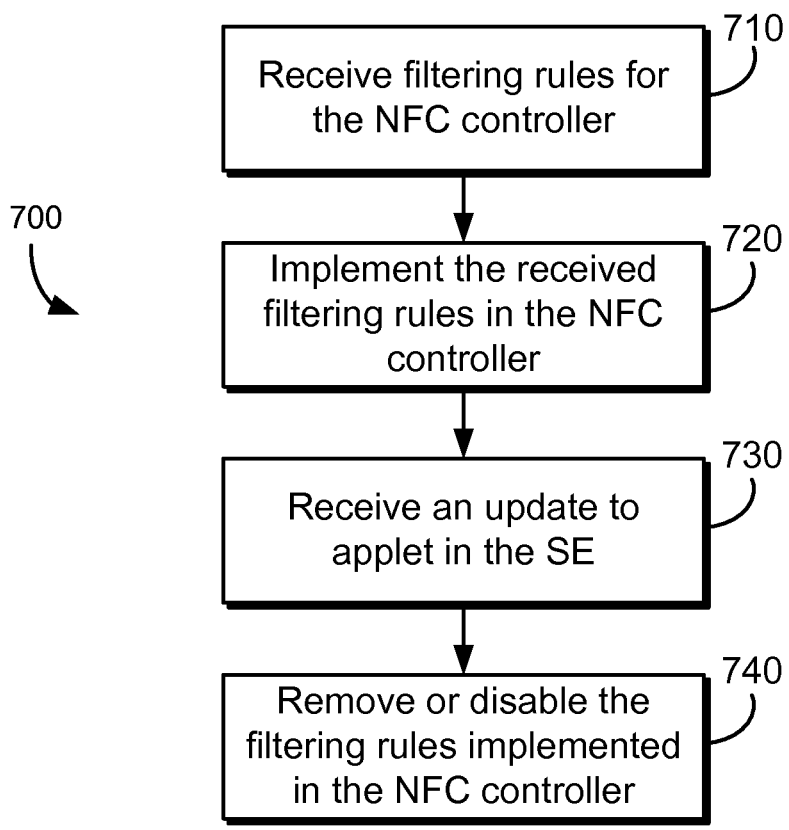
Figure 8:
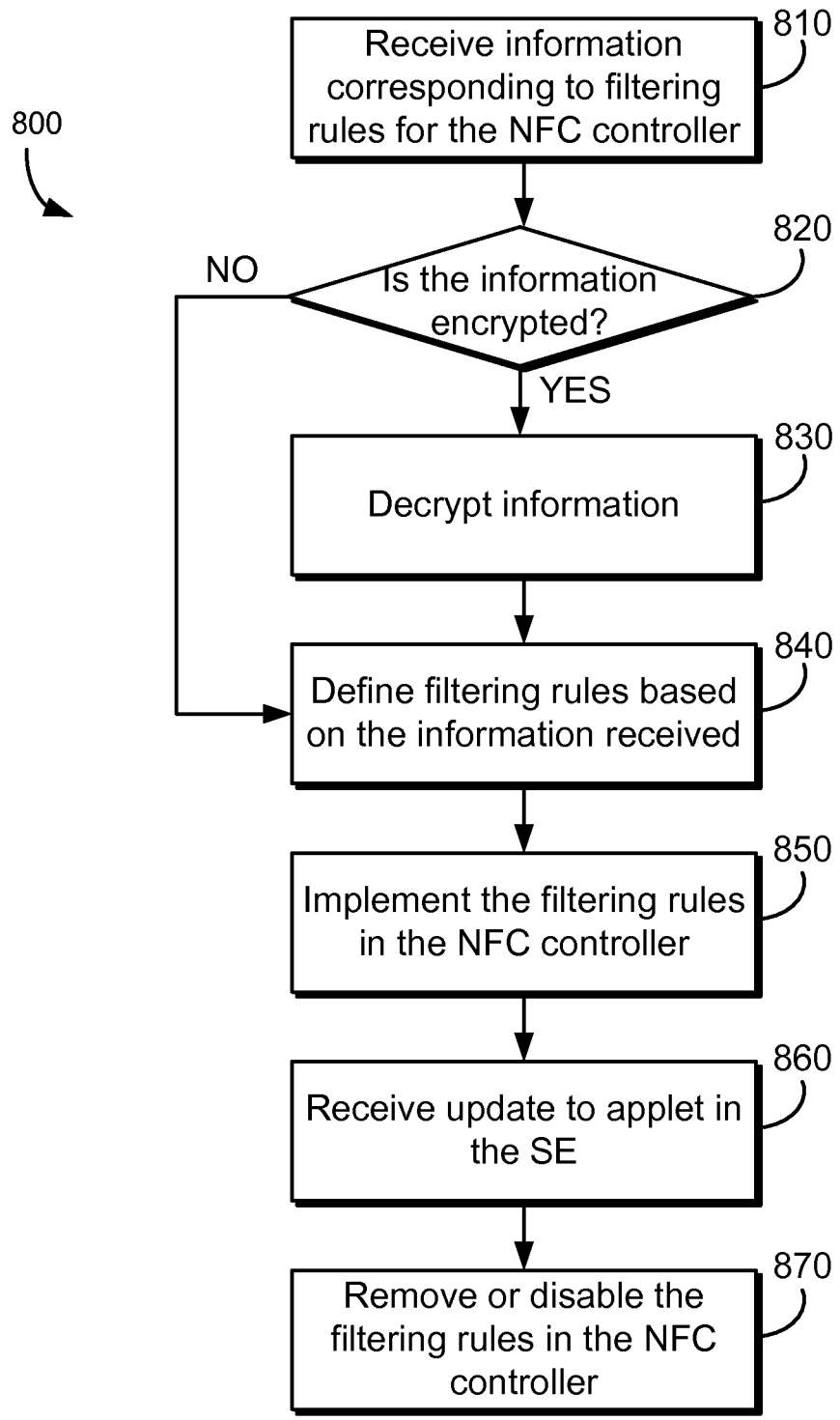

FIGS. 6-8 are each a flow chart that illustrates examples of steps for packet inspection for secure element protection. Referring to FIG. 6, there is shown a flow chart 600 in which, at step 610, the NFC controller 220 can receive one or more filtering rules to address a security vulnerability in the secure element 230. The filtering rules can be received in the communication device 100 having the NFC controller 220 from an entity or some other external source. In some instances, the filtering rules can be received through an NFC connection using the NFC antenna 222. In other instances, the filtering rules can be received through an RF connection (e.g., cellular, IEEE 802.11) using the RF antenna 202.

At step 620, the NFC controller 220 can receive a data packet (e.g., an APDU) that is destined for the secure element 230. The data packet can be received through a contact interface (e.g., from an operating system) or through a contactless interface (e.g., from an NFC connection). At step 630, the NFC controller 220 can inspect or examine the contents of the data packet using the filtering rules received in step 610.

At step 640, the NFC controller 220 can determine, based on the inspection, whether to send the data packet to the secure element 230. When the data packet is to be sent to the secure element 230, the process can proceed to step 650, otherwise, the process can proceed to step 680 and the data packet is discarded by the NFC controller 220.

At step 650, the NFC controller 220 can determine whether any one portion of the data packet is to be modified or replaced based on the filtering rules. When no portion of the data packet is to be modified or replaced, the process can proceed to step 670 and the unmodified data packet can be sent to the secure element 230. Otherwise, the process can proceed to step 660 and the modified data packet can be sent to the secure element 230.

In connection with one or more of the steps described herein, the NFC controller 220 can perform other functions or actions related to rule processing. For example, the NFC controller 220 can introduce additional APDUs or packets. These additional APDUs can precede and/or follow the current APDU that triggered the rule. In another example, the NFC controller 220 can reset the secure element 230 if it is determined that there is an attempt to exploit a vulnerability in an applet. In such an instance, the peer that is sending the communication can be perceived as being hostile and the NFC controller 220 may determine that there is no reason to permit further communication with the secure element 230.

The rules used in connection with the NFC controller 220 can be stateful and can spread across multiple APDUs or packets. For example, some action may be taken when and APDU matching a particular pattern is followed by another APDU matching a different criterion. In such an example, the NFC controller 220 can identify that the first condition was met or satisfied but may not take action until the second condition is also met or satisfied during a future request. Such stateful rules can have a natural reset point such as when the secure element 230 is powered down.

Another approach that can be taken by the NFC controller 220 with respect to functions or actions related to rule processing can be to alter a response APDU or response packet that is sent from the secure element 230 back to the origin. For example, an applet in the secure element 230 can have an inadvertent data disclosure vulnerability that results in some sensitive piece of information being returned in response to an APDU. A rule can be set up with the NFC controller 220 to allow the request or command APDU to be transmitted to the secure element 230 unchanged but to redact or modify the part of the response APDU that contains the sensitive data that is being accidentally revealed by the secure element 230. Such a feature can be applicable when it is desirable to have the applet continue working in its typical (e.g., non-security) scenario. For example, secure element applets tend to have stateful behavior and expect APDUs to arrive in certain sequence. If the APDUs were to be dropped before they reach the secure element 230, the contract may be broken and subsequent APDUs can also fail. In this instance, relaying the request to the secure element 230 and modifying the response instead can prove to be a more effective approach.

Referring to FIG. 7, there is shown a flow chart 700 in which, at step 710, the NFC controller 220 can receive one or more filtering rules to address a security vulnerability in the secure element 230. The filtering rules can be received hard-coded as part of a new firmware image or can be received as instructions or some other description that provides a set of conditions and the appropriate actions to take when those conditions are met. At step 720, the NFC controller 220 can implement the filtering rules. For example, the NFC controller 220 can define a set of commands to add and/or remove the filtering rules and can use those commands to implement the filtering rules received in step 710.

At step 730, the secure element 230, through the NFC controller 220, can receive an applet code update that can permanently fix or address the security vulnerability or flaw that existed in the applet code. At step 740, once the applet code update is installed, the NFC controller 220 can use the set of commands to remove and/or disable the filtering rules that were originally received to address the security vulnerability in the secure element 230. Another command that may be used by the NFC controller 220 can be one in which the existing rules in place are listed to verify that the NFC controller 220 has the necessary patches or fixes in place for a given secure element configuration.

Referring to FIG. 8, there is shown a flow chart 800 in which, at step 810, the NFC controller 220 can receive information corresponding to one or more filtering rules to address a security vulnerability in the secure element 230. The information can be included in a new firmware image. The information can provide instructions or some other description of a set of conditions and the appropriate actions to take when those conditions are met. At step 820, the NFC controller 220 can determine if some or all of the information received is encrypted. When some or all of the information is encrypted, the process can proceed to step 830 where the NFC controller 220 can decrypt the encrypted portions using a key stored in local memory (e.g., the memory 510) before proceeding to step 840. Otherwise, the process can proceed directly to step 840 where the NFC controller 220 can define the filtering rules based on the information received.

At step 850, the NFC controller 220 can implement the filtering rules. For example, the NFC controller 220 can define a set of commands to add and/or remove the filtering rules and can use those commands to implement the filtering rules. At step 860, the secure element 230, through the NFC controller 220, can receive an applet code update that can permanently fix or address the security vulnerability or flaw that existed in the applet code. At step 870, once the applet code update is installed, the NFC controller 220 can use the set of commands to remove and/or disable the filtering rules.

In connection with one or more of the steps described above, the rules received by the NFC controller 220 are typically verified when they are communicated to the NFC controller 220. The NFC controller 220 can maintain a set of currently applicable rules and any addition and/or deletion of a rule can be checked at that point with the set being updated accordingly. From this point on, the NFC controller 220 can operate with an existing rule set that has been cryptographically verified as authentic.

Various implementations provide for a communication device (e.g., the communication device 100) in which an NFC controller (e.g., the NFC controller 220) can receive one or more filtering rules that correspond to a security fix for an applet (e.g., the applet 520) in a secure element or SE (e.g., the secure element 230). The NFC controller can receive a data packet (e.g., the command APDU 400) for the SE and can determine whether to communicate the data packet to the SE based on the one or more filtering rules. In some instances, the NFC controller can modify at least a portion of the data packet when the data packet is communicated to the SE. When at least a portion of the one or more filtering rules is cryptographically protected, the NFC controller can verify that portion of the one or more filtering rules with a key stored in the NFC controller (e.g., the memory 510). The communication device can receive an update (e.g., a code update) for the applet in the SE and the NFC controller can disable the one or more filtering rules after the update for the applet is installed in the SE.

When the data packet includes an APDU, the NFC controller can match information in the one or more filtering rules with information in a portion of the APDU. The portion of the APDU can include one or more of an instruction class, an instruction code, an encoding parameter, and a data payload. The NFC controller can match a data payload length or a data payload pattern in the one or more filtering rules with information in the portion of the APDU.

The NFC controller can receive the data packet through a first interface or through a second interface. The first interface can be an interface between the NFC controller and an operating system (e.g., the operating system 300) executing in the communication device, and the second interface can be an interface between the NFC controller and an NFC antenna (e.g., the NFC antenna 222) communicatively coupled to the NFC controller. The first interface can be referred to as a contact interface, a wired interface, a host interface, and a device interface, for example. In general, the first interface indicates the connection between a channel and the host device. The second interface can be referred to as a contactless interface, a wireless interface, an air interface, or an NFC interface, for example. In general, the second interface indicates a connection between a channel and the NFC antenna. The NFC controller can then determine whether to communicate the data packet to the SE based on whether the data packet is received by the NFC controller through the first interface or through the second interface.

Another implementation provides for a non-transitory machine and/or computer readable storage and/or media, having stored thereon, a machine code and/or a computer program having at least one code section executable by a machine and/or a computer, thereby causing the machine and/or computer to perform the steps as described herein for packet inspection in an NFC controller for secure element protection.

Accordingly, the present disclosure can be realized in hardware, software, or a combination of hardware and software. The present disclosure can be realized in a centralized fashion in at least one computer system; or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure can also be embedded in a computer program product, which includes all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to a particular implementation disclosed, but that the present disclosure will include all implementations falling within the scope of the appended claims.

What is claimed is:

1. A method, comprising:
   in a communication device including a near field communication (NFC) controller and a secure element (SE) communicatively coupled to the NFC controller,
   receiving one or more filtering rules for the NFC controller, the one or more filtering rules corresponding to security for an applet in the SE;
   receiving, at the NFC controller, a data packet for the SE; and
   filtering, by the NFC controller, the data packet for the SE based on the one or more filtering rules.

2. The method of claim 1, wherein the filtering of the data packet for the SE comprises one or more of:
   transmitting the data packet unchanged;
   modifying at least a portion of the data packet when the data packet is communicated to the SE, and transmitting the modified packet; and
   blocking the data packet.

3. The method of claim 1, wherein the data packet includes an application protocol data unit (APDU), the method comprising matching information in the one or more filtering rules with information in a portion of the APDU.

4. The method of claim 3, wherein:
   the portion of the APDU includes one or more of an instruction class, an instruction code, an encoding parameter, and a data payload; and
   the one or more filtering rules correspond a security fix for the applet in the SE.

5. The method of claim 3, comprising matching a data payload length or a data payload pattern in the one or more filtering rules with information in the portion of the APDU.

6. The method of claim 1, comprising receiving the data packet in the NFC controller through a first interface or through a second interface, the first interface being an interface between the NFC controller and an operating system executing in the communication device, and the second interface being an interface between the NFC controller and an NFC antenna communicatively coupled to the NFC controller.

7. The method of claim 6, comprising determining whether to communicate the data packet to the SE based on whether the data packet is received by the NFC controller through the first interface or through the second interface.

8. The method of claim 1, wherein at least a portion of the one or more filtering rules is cryptographically protected, the method comprising verifying that portion of the one or more filtering rules with a key stored in the NFC controller.

9. The method of claim 1, comprising:
   receiving an update for the applet in the SE; and
   disabling the one or more filtering rules after the update for the applet is installed in the SE.

10. A communication device, comprising:
    a secure element (SE); and
    a near field communication (NFC) controller communicatively coupled to the SE, the NFC controller including a memory containing executable instructions that cause the NFC controller to perform a method for handling data, the method comprising,
    receiving one or more filtering rules for the NFC controller, the one or more filtering rules corresponding to security for an applet in the SE;
    receiving, at the NFC controller, a data packet for the SE; and
    filtering, by the NFC controller, the data packet for the SE based on the one or more filtering rules.

11. The communication device of claim 10, wherein the filtering of the data packet for the SE comprises one or more of:
    transmitting the data packet unchanged;
    modifying at least a portion of the data packet when the data packet is communicated to the SE, and transmitting the modified packet; and
    blocking the data packet.

12. The communication device of claim 10, wherein the data packet includes an application protocol data unit (APDU), the method comprising matching information in the one or more filtering rules with information in a portion of the APDU.

13. The communication device of claim 12, wherein:
    the portion of the APDU includes one or more of an instruction class, an instruction code, an encoding parameter, and a data payload; and
    the one or more filtering rules correspond a security fix for the applet in the SE.

14. The communication device of claim 12, wherein the method performed by the NFC controller includes matching a data payload length or a data payload pattern in the one or more filtering rules with information in the portion of the APDU.

15. The communication device of claim 10, wherein the method performed by the NFC controller includes receiving the data packet in the NFC controller through a first interface or through a second interface, the first interface being an interface between the NFC controller and an operating system executing in the communication device, and the second interface being an interface between the NFC controller and an NFC antenna communicatively coupled to the NFC controller.

16. The communication device of claim 15, wherein the method performed by the NFC controller includes determining whether to communicate the data packet to the SE based on whether the data packet is received through the first interface or through the second interface.

17. The communication device of claim 10, wherein at least a portion of the one or more filtering rules is cryptographically protected, the method performed by the NFC controller including verifying that portion of the one or more filtering rules with a key stored in the NFC controller.

18. The communication device of claim 10, wherein the method performed by the NFC controller includes:
    receiving an update for the applet in the SE; and
    disabling the one or more filtering rules after the update for the applet is installed in the SE.

19. A method, comprising:
    in a communication device including a near field communication (NFC) controller and a secure element (SE) communicatively coupled to the NFC controller,
        receiving one or more rules for the NFC controller, the one or more rules corresponding to security for an applet in the SE;
        receiving, at the NFC controller, a data unit for the SE;
        comparing in the NFC controller, at least a portion of the information in the data unit with information in the one or more rules; and
        filtering, by the NFC controller, the data unit for the SE based on the comparison.

20. The method of claim 19, comprising:
    receiving the data unit in the NFC controller through a first interface or through a second interface, the first interface being an interface between the NFC controller and an operating system executing in the communication device, and the second interface being an interface between the NFC controller and an NFC antenna communicatively coupled to the NFC controller; and determining whether to communicate the data unit to the SE based on whether the data unit is received through the first interface or through the second interface.

* * * * *